United States Patent [19]
Mussell et al.

[11] Patent Number: 5,620,807
[45] Date of Patent: Apr. 15, 1997

[54] FLOW FIELD ASSEMBLY FOR ELECTROCHEMICAL FUEL CELLS

[75] Inventors: Robert D. Mussell; Steven P. Webb; Carey L. Scortichini, all of Midland, Mich.; Keith R. Plowman, Lake Jackson, Tex.

[73] Assignee: The Dow Chemical Company, Midland, Mich.

[21] Appl. No.: 522,482

[22] Filed: Aug. 31, 1995

[51] Int. Cl.$^6$ .................................................. H01M 8/10
[52] U.S. Cl. ................... 429/33; 429/41; 429/42
[58] Field of Search ....................... 429/30, 33, 34, 429/40, 41, 44, 43

[56] References Cited

U.S. PATENT DOCUMENTS

| | | | |
|---|---|---|---|
| 3,733,221 | 1/1971 | Sandler et al. | 136/120 |
| 4,287,232 | 9/1981 | Goller et al. | 427/113 |
| 4,505,992 | 3/1985 | Dettling et al. | 429/36 |
| 4,602,426 | 7/1986 | Kampe et al. | 29/623.1 |
| 4,847,173 | 7/1989 | Mitsunaga et al. | 429/41 |
| 4,927,514 | 5/1990 | Solomon et al. | 204/290 R |
| 5,037,917 | 8/1991 | Babb | 526/242 |
| 5,037,918 | 8/1991 | Babb | 526/242 |
| 5,108,849 | 4/1992 | Watkins et al. | 429/30 |
| 5,114,803 | 5/1992 | Ishihara et al. | 429/30 |
| 5,211,984 | 5/1993 | Wilson | 427/115 |
| 5,234,777 | 8/1993 | Wilson | 429/33 |
| 5,252,410 | 10/1993 | Wilkinson et al. | 429/33 |
| 5,300,370 | 4/1994 | Washington et al. | 429/34 |
| 5,308,712 | 5/1994 | Seike et al. | 429/30 |
| 5,330,860 | 7/1994 | Grot et al. | 429/42 |
| 5,395,705 | 3/1995 | Door et al. | 429/42 |

FOREIGN PATENT DOCUMENTS

| | | |
|---|---|---|
| 0276987 | 8/1988 | European Pat. Off. . |
| 0305565 | 3/1989 | European Pat. Off. . |
| 0357077 | 3/1990 | European Pat. Off. . |
| 0364297 | 4/1990 | European Pat. Off. . |

OTHER PUBLICATIONS

Exploratory Fuel Cells for Transportation Program at Los Alamos National Laboratory: $H_2$/Air Fuel Cell Activity, Los Alamos—Materials Science and Technology (Dec. 8, 1994).

Watkins, David E., Fuel Cells for Transportation—Core Research Program, Los Alamos National Laboratory, pp. 1–6 (Dec. 8, 1994).

Wilson, Mahlon S. et al., "Alternative Flow–Field and Backing Concepts for Polymer Electrolyte Membrane Fuel Cells," Extended Abstracts, Abstract No. 656, vol. 95–2, pp. 1043–1044 (Oct. 8–13, 1995).

Scortichini et al., Macroporous Flow Field Assembly, Filed on Oct. 6, 1995 as C–41,939.

*Primary Examiner*—M. Nuzzolillo

[57] ABSTRACT

An electrochemical fuel cell having a membrane electrode assembly and a layer of an electrically conductive porous material adjacent thereto which has at least two portions with different mean pore sizes, wherein a first portion of the layer adjacent to the membrane electrode assembly has a porosity no greater than a second portion of the layer adjacent to the opposite side of the layer; the second portion has a porosity of at least about 82 percent; and the second portion has an mean pore size which is at least about 10 microns and at least ten times greater than the mean pore size of the first portion.

23 Claims, 5 Drawing Sheets

FLOW FIELD ASSEMBLY FOR ELECTROCHEMICAL FUEL CELLS

BACKGROUND OF THE INVENTION

This invention relates to electrochemical fuel cells and, more particularly, to fuel cell membrane electrode assemblies and the flow field structures adjacent thereto.

Electrochemical fuel cells generate electrical current through the oxidation of a fuel. One type of fuel cell employs a membrane electrode assembly ("MEA") including a membrane having an anode side and cathode side, depending on the direction of the current with respect thereto. The membrane itself serves as an electrolyte. A suitable catalyst for the electrochemical reaction is applied to the membrane, or is incorporated into the polymeric composition from which the membrane is prepared.

Located on both sides of the MEA is a flow field which typically consists of a graphite plate which has been machined to provide a series of channels on its surface, as shown, for example, in U.S. Pat. Nos. 5,300,370 and 5,230,966. The channels transport fuel to the anode side and oxidant to the cathode side, and transport reaction products from the cathode side, and are typically separated from the membrane electrode assembly by a thin layer of a porous carbon material, such as carbon fiber paper. However, this layer of porous material limits the operating efficiency of the fuel cell, particularly at higher operating currents, by creating a mass transport limitation within the fuel cell. This limitation may be observed on a graph of voltage vs. current density for the fuel cell, as a sharp increase in the slope of the graph (in the negative direction) as the current density increases, as well as a lower overall power density. It would be desirable to increase the operating efficiency of such fuel cells.

It is known to prepare a fuel cell having a layer of a carbon/polytetrafluoroethylene mixture deposited on a graphite cloth or paper prepared from a dispersion of carbon and polytetrafluoroethylene in water. However, the operating efficiency of such fuel cells is still less than desirable.

SUMMARY OF THE INVENTION

In one aspect, this invention is an electrochemical fuel cell having a membrane electrode assembly and a layer of an electrically conductive porous material adjacent thereto which has at least two portions with different mean pore sizes, wherein a first portion of the layer adjacent to the membrane electrode assembly has a porosity no greater than a second portion of the layer adjacent to the opposite side of the layer; the second portion has a porosity of at least about 82 percent; and the second portion has an mean pore size which is at least about 10 microns and at least ten times greater than the mean pore size of the first portion.

In a second aspect, this invention is an electrochemical fuel cell having a membrane electrode assembly with a nonwoven porous layer of an electrically conductive porous material adjacent thereto which has at least two portions with different mean pore sizes, wherein a first portion of the layer adjacent to the membrane electrode assembly has a porosity no greater than a second portion of the layer adjacent to the opposite side of the layer; the second portion has a porosity of at least about 50 percent; and the second portion has a mean pore size which is at least about 35 microns and at least ten times greater than the mean pore size of the first portion.

In a third aspect, this invention is a process for preparing an electrochemical fuel cell having a membrane electrode assembly comprising the steps of: (a) applying a layer of a conductive composition to a sheet of a porous conductive material having a porosity of at least about 82 percent under conditions sufficient to form a porous, solid layer of the conductive composition on one side of the sheet of porous conductive material, forming a composite thereby, and (b) placing the composite adjacent to the membrane electrode assembly so that the side of the composite to which the conductive composition was applied is facing said assembly.

It has been discovered that the fuel cells of the invention as well as fuel cells prepared by the process of the invention are able to operate at a high current density at a relatively high voltage, have a relatively high power density, and provide a high power density even when operated under relatively low gas pressures. These and other advantages of the invention will be apparent from the description which follows.

DETAILED DESCRIPTION OF THE INVENTION

Figure 1:
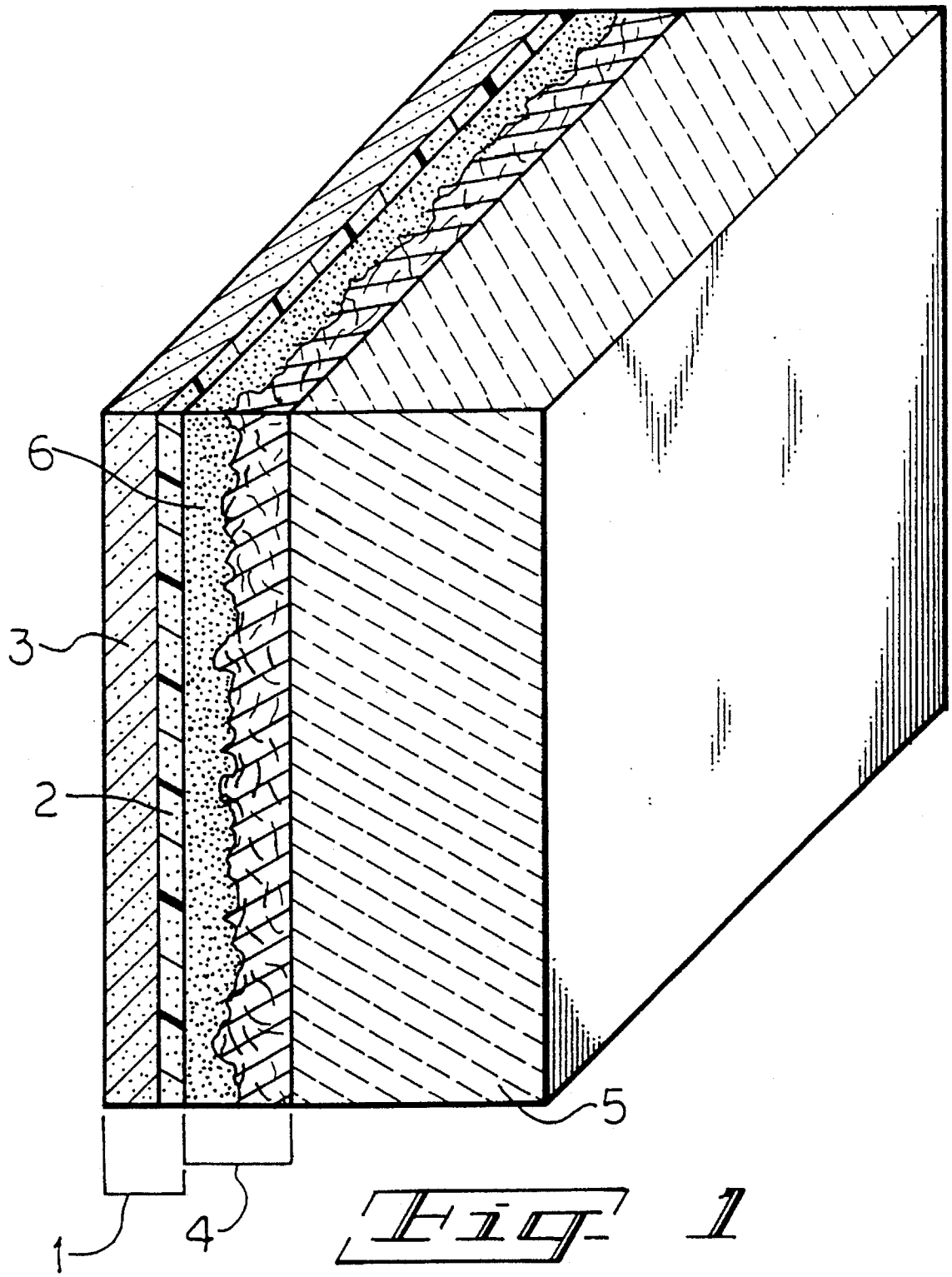
FIG. 1 illustrates a membrane electrode assembly having a porous layer and a flow field adjacent thereto.

Referring now to FIG. 1, the term "membrane electrode assembly" (1) as used herein refers to the combination of the solid polymer membrane and catalyst in the fuel cell assembly, regardless of its configuration or method of preparation. The layer of membrane material containing the catalyst is referred to as the "active layer", regardless of whether the catalyst is incorporated into a discrete layer of polymer (2) and applied or laminated to the surface of the membrane (3), or incorporated into the membrane itself. Porous layer (4) is a layer of an electrically conductive porous material having at least two portions with different mean pore sizes and is located between the active layer and the flow field. The flow field (5) may comprise a machined graphite plate, or may be primarily comprised of a thicker layer of porous carbon material as described, for example, in U.S. Pat. No. 5,252,410. The term "catalyst" as used herein refers to a metal or compound which is catalytic for the electroreduction of oxygen or electrooxidation of hydrogen or methanol under the pressure and temperature conditions in the fuel cell. However, the porous layer (4) does not contain any catalysts which are typically present in the active layer, such as platinum.

The fuel cells of the invention contain a layer of an electrically conductive porous material (hereafter, "intermediate layer") which is adjacent to the membrane electrode assembly and has at least two portions with different mean pore sizes. The portion of the layer adjacent to the membrane electrode assembly (6) (hereafter, "small pore region") has a mean pore size which is at least ten times smaller than the portion of the layer adjacent to the opposite side of the layer (7) (hereafter, "large pore region"). Compositions suitable for use in the preparation of the intermediate layer include any organic or inorganic composition which can be fabricated into a solid layer having the porosity and pore size characteristics referred to above, and which also has sufficient dimensional, hydrolytic and oxidative stability under the operating conditions of the fuel cell. One method of preparing an intermediate layer having assymetrical pore size characteristics is to prepare such a layer from two or more materials having different mean pore sizes. An example of such a method is to first obtain or prepare a material having a mean pore size suitable for the large pore region (hereafter, "large pore material"), and then infiltrate and/or coat one side of the material with a composition which will reduce the porosity of a portion of the material sufficiently to obtain the smallest desired pore size, and/or form a discrete layer of the composition on the outside of the material having the desired small pore characteristics.

Typically, in a fuel cell, the membrane and the layer of polymer containing a metal catalyst ("active layer") must be hydrated in order to be sufficiently ionically conductive. During operation of the fuel cell, water is formed on the cathode side of the active layer, which condenses within the adjacent flow field. Water may also be present due to the humidification of one or both of the reactant gases. However, if too much water condenses or otherwise accumulates adjacent to the active layer or within the active layer, the efficiency of the fuel cell is reduced, since diffusion of gas through liquid water is slow relative to its diffusion through water vapor.

It is believed, without intending to be bound, that the small pore region of the layer reduces the accumulation of excess liquid water in or next to the active layer because it serves as a semi-permeable layer or membrane which permits the water vapor generated within the active layer or present due to the humidification of the reactant gases to pass between the active layer and the flow field, but reduces or prevents condensation of water on the active layer and reduces or prevents the liquid water present in the flow field or large pore region of the intermediate layer from passing back through the small pore region to the active layer. Preferably, the wettability (determined by the pore size and water-solid contact angle) of the small pore region is such that for a sufficiently large fraction of the pores the displacement pressure required to force liquid water into these pores is larger than the hydraulic pressure in the flow field components under the prevailing condition of pressure and temperature in the fuel cell.

Examples of suitable organic compositions which may be used to prepare or infiltrate the large pore material include thermoplastic or thermosetting polymeric and oligomeric materials, such as polytetrafluoroethylenes (such as Teflon™, available from DuPont), including those which have sulfonic acid groups, (such as Nafion™, available from DuPont), poly(alkylene oxide)s, polyolefins, polycarbonates, benzocyclobutanes, perfluorocyclobutanes, polyvinyl alcohols, and polystyrene, epoxy resins, perfluoroalkyl/acrylic copolymers, polyanilines, polypyrroles, as well as mixtures thereof. Preferably, the composition is a polytetrafluoroethylene, perfluoroalkyl/acrylic copolymer, or a perfluorocyclobutane, and is most preferably a perfluorocyclobutane. Examples of suitable inorganic compositions which may be used include clays, silicates, and titanium-based compositions.

The composition used to prepare the small pore region of the intermediate layer preferably contains polymer, carbon particles, and a suitable carrier. The carrier will typically infiltrate the entire large pore material, although the majority of the polymer and carbon particles will collect on or close to the surface of the side of the material to which it is applied (depending on its porosity and the size of the particles contained in the composition), thereby forming the small pore region on the side of the material to which the composition is applied. Accordingly, the regions or portions of the intermediate layer having different mean pore sizes are not necessarily discrete layers, so long as at least the first 1 micron of depth of the small pore region and at least the first 50 microns of depth of the large pore region (as measured from the surface of the layer in a direction perpendicular to the layer) has the necessary pore characteristics.

The intermediate layer may also be prepared by applying the composition used in the preparation of the small pore region to the membrane electrode assembly, and then positioning or laminating a layer of a large pore material adjacent thereto. Alternatively, a film of the composition used in the preparation of the small pore region may be prepared separately using conventional film manufacturing techniques, and then positioned or laminated between the membrane electrode assembly and the large pore material. If the composition is applied to the MEA, it may be applied using any suitable coating technique, such as by painting or silk-screening.

The small pore region of the intermediate layer is preferably at least as hydrophobic as the active layer. The composition used to prepare the small pore region is preferably a liquid-based composition which will solidify after application. If the composition which is applied is solvent-based, enough of the solvent is removed to form a solid layer of material prior to assembling the fuel cell. Such solvent may be removed either at ambient conditions or at elevated temperatures. If appropriate, the composition is heated to increase its stability and uniformity, such as by crosslinking, molecular weight advancement, or agglomerating latex particles.

If the composition used to prepare the small pore region is to be applied directly to the membrane electrode assembly, the majority of the dissolved solids contained therein (such as the polymer) are preferably hydrophilic in character, since the membrane and active layer are normally prepared from a hydrophilic composition, and application of a solution of a primarily hydrophobic dissolved solids would normally be expected to adversely affect the properties of the active layer. However, the composition used to prepare the small pore region is still preferably hydrophobic after being cured.

Hydrophobic fillers, such as carbon fibers and/or powders treated with hydrophobic compositions such as silane- and fluorine-based compositions, may be used in the compositions that are used to prepare the small pore region to give it some hydrophobic character and affect the wettability of its pores, as well as increase the porosity and mean pore size of the solidified composition. In such cases, the weight ratio of carbon fibers or powders to the other components in the composition is preferably at least about 1:1, more preferably at least about 3:1; and preferably no greater than about 10:1, more preferably no greater than about 5:1; and is most preferably about 3:1. If the small pore region is prepared by applying the composition to a large pore material, such as a graphite paper, the relatively fine pore structure of the paper will help keep the majority of fillers in the composition close to the surface on the side of the paper to which it is applied. Alternatively, the composition may be one which is primarily hydrophilic as applied, but hydrophobic upon curing, such as a polytetrafluoroethylene latex. If the small pore region is prepared by applying a hydrophilic composition to a large pore material, a thin coating of a highly hydrophobic material such as Zonyl™ 7040, a perfluoroalkyl acrylic copolymer available from DuPont, may be applied to the side of the small pore region facing the MEA to further increase its hydrophobicity. Other examples of highly hydrophobic materials include Fluorad™ FC 722 and FC 724, available from 3M.

The MEA may be prepared by any suitable method, but is preferably prepared by applying the catalyst ink (a suspension or dispersion of the catalyst) directly to the membrane as described, for example, in U.S. Pat. No. 5,211,984. If the catalyst is to be applied to a porous carbon material, the composition used to prepare the small pore region is preferably applied first, followed by the catalyst ink, so that the infiltrated porous carbon material may be utilized as an intermediate layer, as well as a support layer for the catalyst. However, this method, as well as any methods which require the preparation of a separate film for the intermediate layer are less preferred since such films and catalyst-containing structures must typically be laminated to the membrane portion of the membrane electrode assembly in order to assemble the fuel cell. Such lamination processes, wherein heat and/or excessive pressure is applied to the intermediate layer, may alter or damage its pore structure.

Further, the composition of the intermediate layer may be formulated to optimize the maximum voltage at which the fuel cell will operate at a given current density. It is believed that higher voltages at higher current density require the small pore region to be more hydrophobic than at lower current densities. For example, if a higher voltage at a lower current density is desired, compositions having a higher carbon/polymer ratio (such as about 5:1) are preferred for use in the preparation of the small pore region, particularly when applied to a graphite paper having a relatively low porosity. Likewise, if higher voltages at higher current densities are preferred, lower carbon/polymer ratios (such as about 3:1) are preferred, particularly when applied to a graphite paper having a relatively high porosity.

The small pore region preferably has a thickness in the range of from about 1 micron to about 150 microns (as measured in a direction perpendicular to the intermediate layer), and has the desired porosity and pore size characteristics. More preferably, the region has a thickness in the range of from about 5 to about 25 microns. Preferably, the portion of the region adjacent to the MEA is sufficiently porous to permit the transmission of water vapor through the region. The porosity of this portion of the region is preferably at least about 10 percent. The mean pore size of the small pore region is preferably at least about 0.1 micron, more preferably at least about 1 micron; but is preferably no greater than about 10 microns. The mean pore size may be measured by any convenient method, such as by mercury porosimetry. The device used to measure the mean pore size distribution of the layer may be calibrated using silica/alumina calibration standards (available from Micromertrics, Norcross, Ga.).

The term "mean pore size" as used herein means that half the open volume of the material is contained in pores larger in diameter than the mean pore size, and half is contained in pores equal to or smaller than the mean pore size. The porosity of the small pore region is preferably at least about 10 percent. Conductive fillers and non-conductive inert or fugitive fillers may be incorporated into the composition to achieve the desired pore structure. Intrinsically conductive polymers such as doped polyaniline or polypyrrole may also be used to prepare the composition in order to increase its conductivity. The pore structure of the small pore region may also be controlled to some extent by the selection of the polymer or the use of an oligomeric composition.

The large pore region preferably has a thickness of at least about 2 mils, more preferably at least about 6 mils; but is preferably no greater than about 50 mils. The porosity of this region is preferably at least about 82 percent, more preferably at least about 85 percent, and most preferably at least about 87.5 percent. The mean pore size of the large pore region is preferably at least about 30 microns. The porosity and pore size values given above represent the characteristics of the small pore region for at least the first micron of its depth from the side of the intermediate layer next to the MEA and at least the first 50 microns of its depth from the opposite side of the intermediate layer, regardless of its method of preparation.

Examples of suitable porous carbon materials which may be utilized as the large pore material include carbon paper, graphite paper, carbon felts, or other carbon-based composites which comprise at least about 20 percent by weight of carbon. When desirable, the porous carbon material may be treated with a perfluorosilane or fluorine composition to increase its hydrophobicity, or oxidized, sulfonated, or coated with a hydrophilic material to increase its hydrophilicity. If a porous carbon material is utilized as both the flow field and the large pore material may have interdigitated channels cut into it to lower the pressure drop introduced into the reactant gases. The conductivity of the intermediate layer is preferably at least about 0.01 Siemens/cm (S/cm), more preferably at least about 0.1 S/cm, and most preferably at least about 10 S/cm. The conductivity of the layer may be increased by the addition of conductive fillers, such as carbon fibers or particles, or by the incorporation of conductive salts or polymers.

Illustrative Embodiments

The following examples are given to illustrate the invention and should not be interpreted as limiting it in any way. Unless stated otherwise, all parts and percentages are given by weight.

EXAMPLE 1

Membrane and electrode structures are prepared as follows (MEA 1): An ion exchange membrane prepared from perfluorosulfonic acid ionomer having an equivalent weight of 800, a thickness of 2.4 mil (60 µm) dried and 5 mil (127 µm) fully hydrated (available from The Dow Chemical Company as XUS 13204.20) is obtained and cut into sheets 11 cm by 11 cm and placed into a NaOH bath to convert it to the $Na^+$ form. The electrode ink is prepared by mixing 1.08 g of a 5.79 weight percent solution of the above ionomer (in a 50:50 volume percent ethanol/water solution), 0.1875 g of 20 weight percent platinum on carbon (available from E-TEK (Natick, Mass.)) and 0,114 g of tetrabutylammonium hydroxide (TBAOH), and 0.6 g of propylene carbonate (dispersing aid). The mixture is agitated with a stir bar overnight or until the mixture is uniformly dispersed. An additional 1.2 g of propylene carbonate is then added to the mixture.

The catalyst ink is painted onto a clean, 9 $cm^2$ Teflon™-coated fiberglass blank (CHR Industries, New Haven, Conn.) which has been dried in a oven at 110° C. and pre-weighed. The blank is painted twice with the catalyst ink, which is completely dried before the application of the second layer. Pt loadings are 0.14 $mg/cm^2$ on the anode and 0.25 $mg/cm^2$ on the cathode. The MEA is formed by aligning a coated blank on each side of the ionomer membrane which has been dried on a vacuum table. The blanks and membrane are placed between two pieces of stainless steel to hold them while they are placed into the press. The assembly is placed into a press at 195° C. and pressed at a pressure of 100 pounds per $cm^2$ of blank for 5 minutes. The press package is allowed to cool to room temperature before opening. The blank is peeled away from the catalyst layer leaving the film adhered to the surface of the membrane.

Another MEA sample (MEA 2) is prepared by applying the catalyst ink directly to the surface of the ionomer membrane. The amount of ink transferred is determined by weighing the bottle and brush before and after applying the ink. Once again the ink is applied in multiple coats but in this case the successive coats are applied without requiring the ink to fully dry between applications. The membrane is held in place on a vacuum table having a fine sintered stainless steel frit on top of a heated vacuum manifold plate. The vacuum table is operated between 45° C. and 60° C. as the ink is applied. The second side of the membrane may be coated in the same manner. This structure is then pressed as described for MEA 1.

The membrane and ionomer binder of both samples are converted back to the proton form by refluxing in 1 normal sulfuric acid for 0.5 hours. The MEA is dried again on the vacuum table and stored in a dry environment until used.

An intermediate layer (IL 1) is prepared as follows: An ink is prepared from 3 g of Vulcan™ XC-72 carbon, 2 g of a 50 weight percent solution of a perfluorocyclobutane polymer (poly(1,1,2-tris(4-trifluorovinyloxyphenyl)ethane, prepared as described in U.S. Pat. No. 5,037,917 and B-staged in mesitylene to produce a polymer with an average molecular weight in the range of from about 4,000 to about 8,000) and 31 g of mesitylene. The ink is applied in two applications to a 0.25 g/cm$^3$-8 mil thick untreated graphite paper having a porosity of about 87 percent and a mean pore size of about 50 microns (Spectracorp, Lawrence, Mass. to obtain a loading of 2 mg/cm$^2$ polymer and carbon. The ink is not required to completely dry between applications. The solvent is allowed to evaporate and the polymer is fully cured at 200° C. under vacuum for 1 hour. The C/polymer layer is placed next to the active layer in the cell assembly and is held in place by a Teflon gasket and the cell compression.

Another intermediate layer/MEA sample (IL 2) is prepared by the following method: A coating ink is prepared by mixing Vulcan XC-72R carbon powder with 2 weight percent of a dispersing agent (Triton X-100, DuPont) to make a 20 percent solids solution which is stirred overnight. Next, polytetrafluoroethylene (PTFE) latex (T-30B, available from DuPont) diluted to 6 weight percent solids is added in an amount sufficient to provide a carbon/PTFE weight ratio of 3:1 and gently mixed for 1–2 min. The ink is applied to the untreated graphite paper (9 mil thick, 0.25 g/cm$^3$ density, 87 percent porosity and 50 micron mean pore size, obtained from Spectracorp) using a #40 Meyer Rod and air dried. The sample is then placed in an inert atmosphere oven at 340° C. for 6 hours to sinter the PTFE to render it hydrophobic. This procedure also produces a coating weight of about 2 mg/cm$^2$ (carbon and PTFE solids).

The membrane electrode assemblies are then tested in a test fuel cell prepared by Fuel Cell Technologies, Inc. (Santa Fe, N. Mex.). The flow fields are comprised of solid graphite blocks with machined-in serpentine channels. The MEA is placed into the cell with an intermediate layer on each side. The cell is placed onto a single cell test stand made by Fuel Cell Technologies, Inc. The anode (H$_2$) and cathode (air or O$_2$) flows are held fixed and do not vary with the current density. The flow rates used for a given test are defined by specifying a current density and a stoichiometric multiple for that current density. For example, the cathode flow rate of air may be specified as 2× stoichiometric at 1.0 A/cm$^2$. In this case, the flow rate is twice that required to sustain a current density of 1 A/cm$^2$. Thus, when the cell is operating at 0.5 A/cm$^2$, this same flow is 4 times that which is required to sustain the current density. The anode and cathode pressures are held at 30 and 40 psig, respectively. The cell temperature is 80° C. while the external humidifiers are set at 100° C. for the anode and 85° C. for the cathode. The cell is preconditioned at 0.5 V load for 12 hours.

Figure 2:
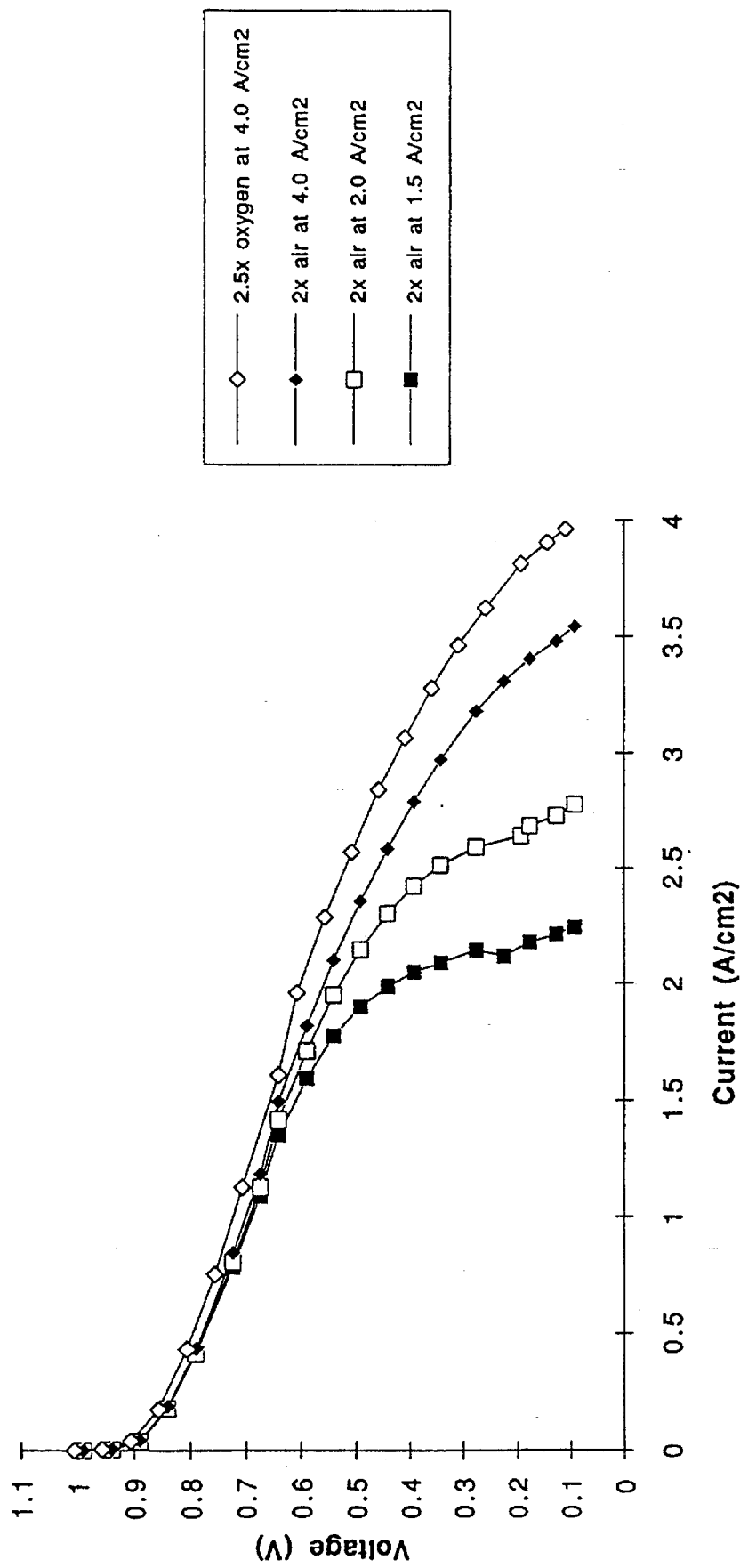
FIG. 2, FIG. 3, FIG. 4, and FIG. 5 illustrate the performance of fuel cells which incorporate the porous layers prepared as described in the Examples.
Figure 3:
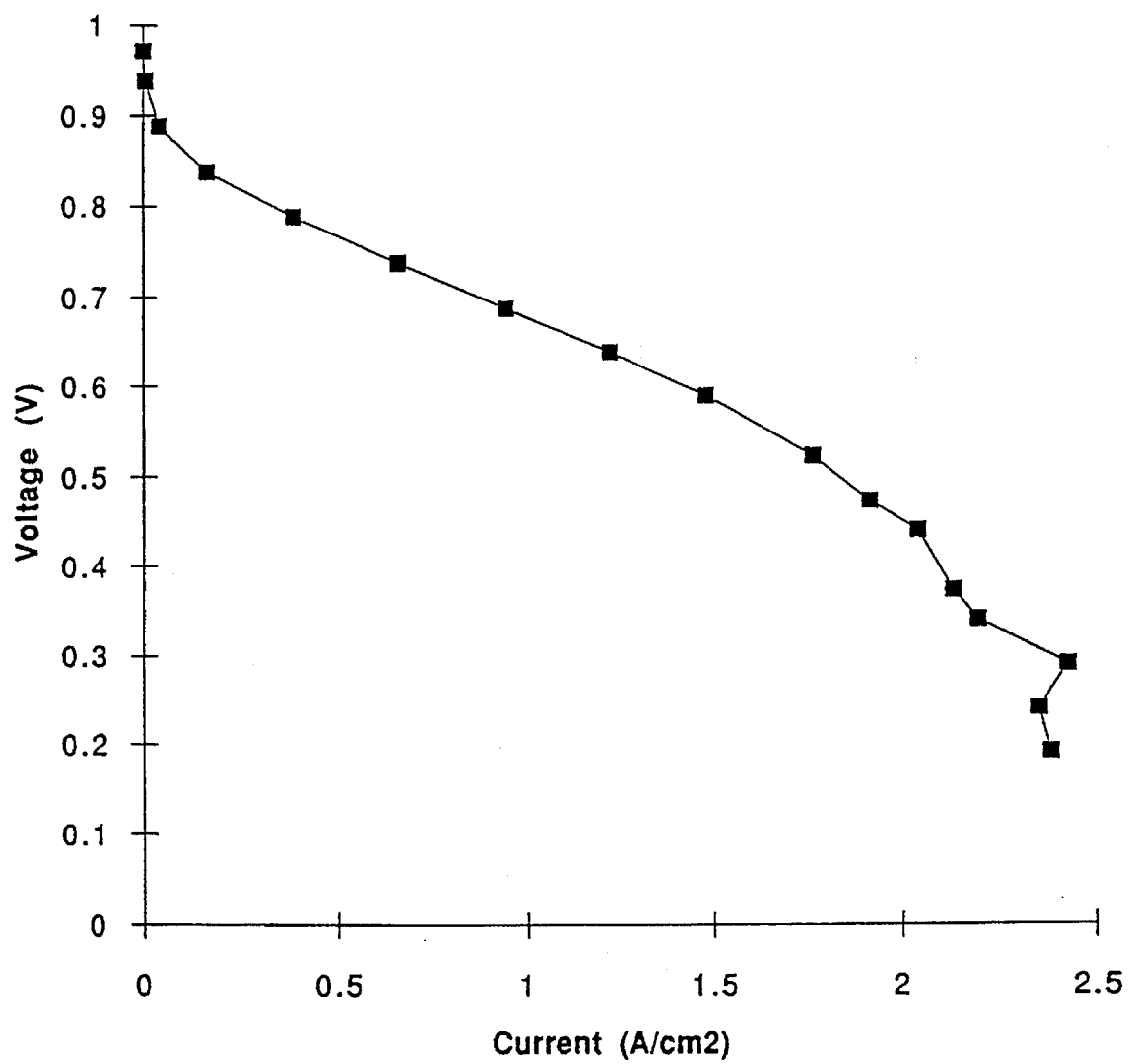
Figure 4:
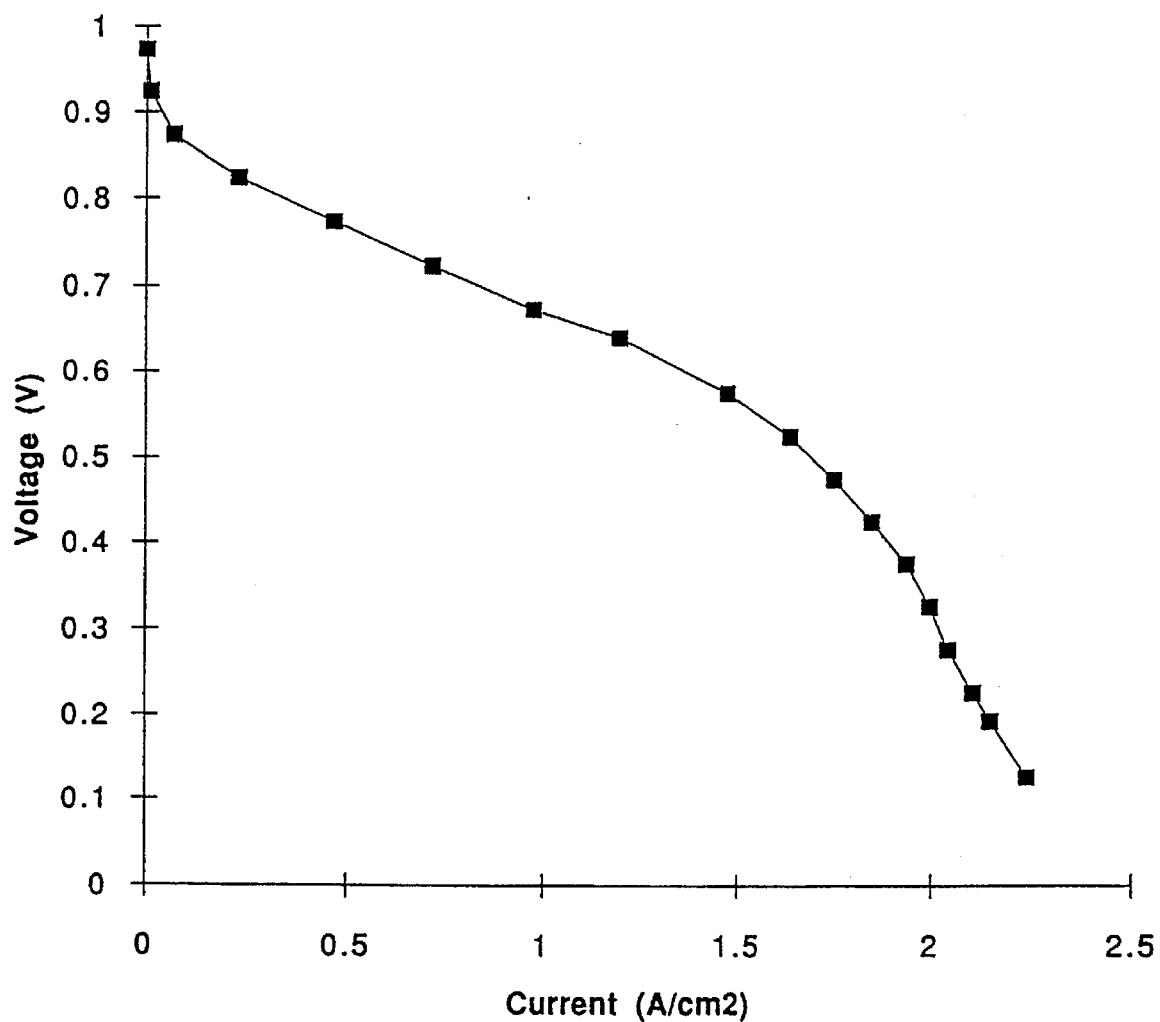

FIG. 2 illustrates the performance of a fuel cell containing MEA 1 and IL 1 prepared as described above. The figure shows that the fuel cell performance utilizing air as a fuel approaches that of oxygen. The hydrogen flow rate is at the same stoichiometry as the air or oxygen flow, and the gas pressure on the anode and cathode is 30 psig and 40 psig, respectively. FIG. 3 shows the performance of this same fuel cell at a hydrogen pressure of 30 psig at a flow rate of 2× at 1.0 Amp/cm$^2$, and an air pressure of 40 psig at a flow rate of 3× at 1.0 A/cm$^2$ over the entire curve. FIG. 4 illustrates the operation of a fuel cell containing MEA 1 and IL 2 prepared as described above, under the same flow conditions as used in the Example shown in FIG. 3.

EXAMPLE 2

Figure 5:
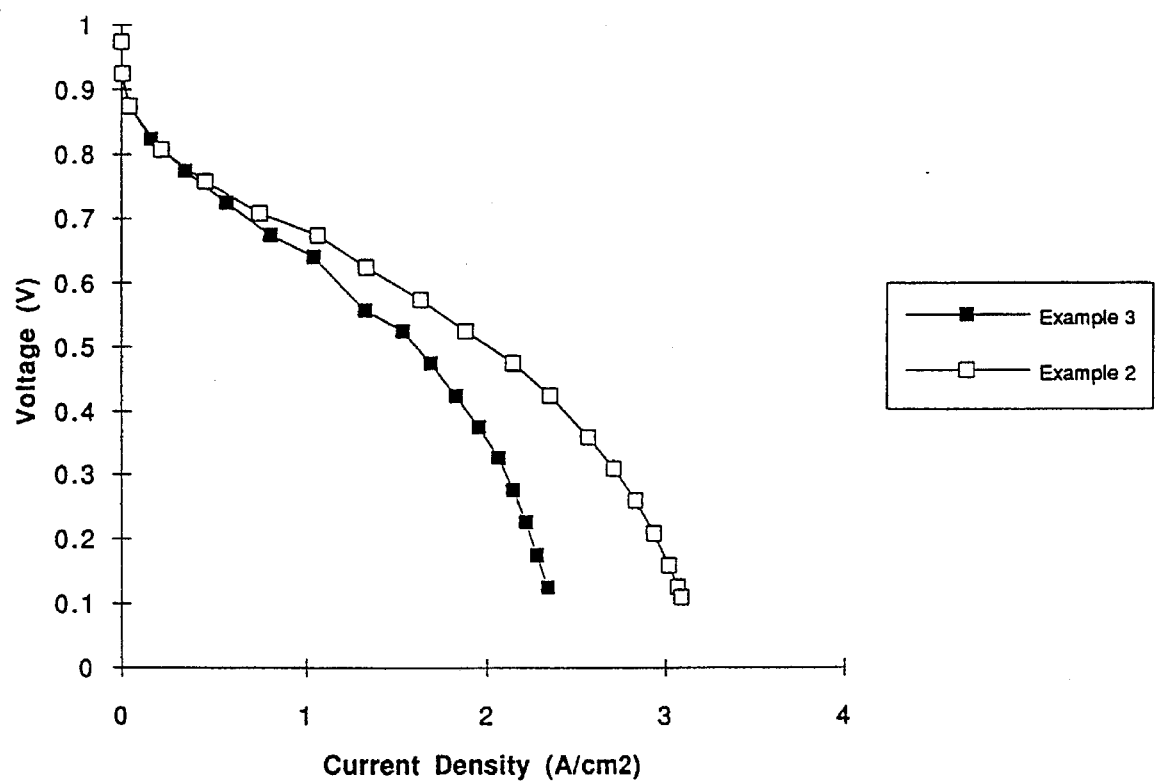

An MEA is prepared as described in Example 1 (MEA 1). The ink used to prepare the small pore region is prepared as described in Example 1 (IL 1), except that it is applied to an 84.5 percent porous 9.0 mil (225 μm) thick graphite paper obtained from Toray (Tokyo, JP). The large pore graphite paper functions as both part of the intermediate layer and the flow field in the single cell test stand. The outside edges of the graphite paper are filled with an inert material to prevent the escape of reactant gases. In these single cell tests, reactant gases are applied to the face of the graphite paper in such a way that flow then occurs in the plane of the graphite paper in the direction parallel to the plane of the active catalyst layer. The gases are delivered to the porous graphite paper by pyrolyzed graphite blocks with a single delivery and exit channel (available from POCO Graphite, Decatur, Tex.). FIG. 5 illustrates the performance of the MEA described above (for FIG. 4) at hydrogen and air flow at 2 stoichs at 2.0 A/cm$^2$ at a pressure of 20 psig hydrogen and 30 psig air for the entire curve.

EXAMPLE 3

An MEA is prepared as described in Example 1 (MEA 1). Graphite fibers and carbon powder used in the preparation of the small pore layer are pretreated by soaking them in a 1 weight percent toluene solution of tridecafluoro-1,1,2,2-tetrahydrooctyl-1-trichlorosilane at 80° C. for 3 minutes to render them hydrophobic. The fibers and particles are then rinsed in excess toluene and dried at room temperature. The graphite fibers are received in 0.25" lengths. The fibers are blended in a Waring blender in a glycerol mixture for 10 minutes or until the desired length is obtained (<1 mm). The fibers are rinsed with excess water and dried. The small pore layer is formed by painting a second ink on top of the catalyst layer. The ink is prepared by combining 0.05 g of the treated graphite fibers (7 μm diameter from Fortafil), 0.05 g of carbon powder (Vulcan XC-72), 1.0 g of a 5 weight percent Nafion™ solution, 0.07 g of TBAOH (1 molar solution in methanol), and 1.2 g of propylene carbonate.

The MEA with the small pore layer applied thereto is placed into a single test cell with a porous graphite flow field (0.2 g/cm$^3$, 24 mil (600 μm) thick graphite paper from Spectracorp having a porosity of approximately 90 percent) and tested in accordance with the procedure described in Example 1.

FIG. 5 illustrates the performance of the MEA described above, at hydrogen and air flow at 2 stoichs at 2.0 A/cm$^2$ at a pressure of 20 psig hydrogen and 30 psig air for the entire curve.

What is claimed is:

1. An electrochemical fuel cell having a membrane hydrated electrode assembly and a layer of an electrically conductive porous material adjacent thereto which has at least two portions with different mean pore sizes, wherein a first portion of the layer adjacent to the membrane electrode assembly has a porosity no greater than a second portion of the layer adjacent to the opposite side of the layer; the second portion has a porosity of at least about 82 percent; and the second portion has a mean pore size which is at least about 10 microns and at least ten times greater than the mean pore size of the first portion.

2. The fuel cell of claim 1 wherein the first portion of the porous layer is hydrophobic.

3. The fuel cell of claim 1 wherein the first portion of the porous layer comprises a polytetrafluoroethylene polymer.

4. The fuel cell of claim 1 wherein the first portion of the porous layer comprises a perfluoroalkyl/acrylic copolymer.

5. The fuel cell of claim 1 wherein the first portion of the porous layer comprises a perfluorocyclobutane polymer.

6. The fuel cell of claim 1 wherein the mean pore size of the first portion of the porous layer is at least about 0.1 micron.

7. The fuel cell of claim 1 wherein the mean pore size of the first portion of the porous layer is at least about 1 micron.

8. The fuel cell of claim 1 wherein the porosity of the second portion of the porous layer is at least about 82.5 percent.

9. The fuel cell of claim 1 wherein the porosity of the second portion of the porous layer on its second side is at least about 85 percent.

10. The fuel cell of claim 1 wherein the porosity of the second portion of the porous layer is at least about 87.5 percent.

11. The fuel cell of claim 1 wherein the second portion of the porous layer is more hydrophilic than the first portion.

12. The fuel cell of claim 1 wherein the first portion of the porous layer has a mean pore size of at least about 30 microns.

13. An electrochemical fuel cell having a membrane electrode assembly with a nonwoven porous layer of an electrically conductive porous material adjacent thereto which has at least two portions with different mean pore sizes, wherein a first portion of the layer adjacent to the membrane electrode assembly has a porosity no greater than a second portion of the layer adjacent to the opposite side of the layer; the second portion has a porosity of at least about 50 percent; and the second portion has an mean pore size which is at least about 35 microns and at least ten times greater than the mean pore size of the first portion.

14. The fuel cell of claim 13 wherein the first portion of the porous layer is hydrophobic.

15. The fuel cell of claim 13 wherein the first portion of the porous layer comprises a polytetrafluoroethylene polymer.

16. The fuel cell of claim 13 wherein the first portion of the porous layer comprises a perfluoroalkyl/acrylic copolymer.

17. The fuel cell of claim 13 wherein the first portion of the porous layer comprises a perfluorocyclobutane polymer.

18. A process for preparing an electrochemical fuel cell having a membrane electrode assembly comprising the steps of: (a) applying a layer of a conductive composition to a sheet of a porous conductive material having a porosity of at least about 82 percent under conditions sufficient to form a porous, solid layer of the conductive composition on one side of the sheet of porous conductive material, forming a composite thereby, and (b) placing the composite adjacent to the membrane electrode assembly so that the side of the composite to which the conductive composition was applied is facing said assembly.

19. The process of claim 18 wherein the conductive composition comprises a polytetrafluoroethylene polymer, perfluoroalkyl/acrylic copolymer, or perfluorocyclobutane polymer.

20. The process of claim 19 wherein the conductive composition additionally comprises carbon fibers and/or powders and the weight ratio of the fibers and/or powders to the polymers is at least about 1:1.

21. The process of claim 19 wherein the conductive composition additionally comprises carbon fibers and/or powders and the weight ratio of the fibers and/or powders to the polymers is at least about 3:1.

22. The process of claim 19 wherein the conductive composition additionally comprises carbon fibers and/or powders and the weight ratio of the fibers and/or powders to the polymers is no greater than about 0:1.

23. The process of claim 20 wherein the conductive composition additionally comprises carbon fibers and/or powders and the weight ratio of the fibers and/or powders to the polymers is no greater than about 5:1.

* * * * *

UNITED STATES PATENT AND TRADEMARK OFFICE
CERTIFICATE OF CORRECTION

PATENT NO : 5,620,807

DATED : April 15, 1997

INVENTOR(S) : Robert D. Mussell; Steven P. Webb; Carey L. Scortichini; Keith R. Plowman It is certified that error appears in the above-identified patent and that said Letters Patent are hereby corrected as shown below:

Sheet 1 of 5, Figure 1, should appear as follows:

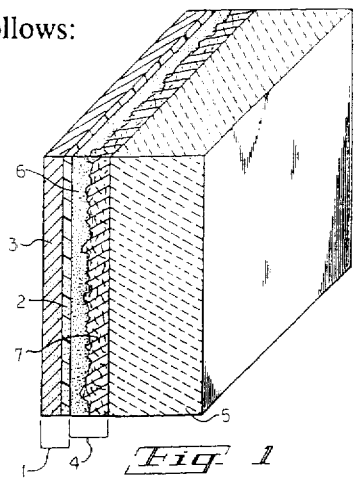

Column 9, claim 1, line 6, following <u>An</u>, delete "electrochemical"

Column 9, claim 1, line 6, following <u>An</u>, insert -- proton exchange membrane --

Column 9, claim 1, line 6, following <u>a</u> "membrane hydrated" should correctly read -- hydrated membrane --

Column 9, claim 13, line 44, following <u>An</u>, delete "electrochemical"

Column 9, claim 13, line 44 following <u>An</u>, insert -- proton exchange membrane --

Column 10, claim 18, line 16, following <u>an</u>, delete "electrochemical"

Column 10, claim 18, line 16, following <u>an</u>, insert -- proton exchange membrane --

UNITED STATES PATENT AND TRADEMARK OFFICE
CERTIFICATE OF CORRECTION

PATENT NO : 5,620,807

DATED : April 15, 1997

INVENTOR(S) : Robert D. Mussell; Steven P. Webb; Carey L. Scortichini; Keith R. Plowman It is certified that error appears in the above-identified patent and that said Letters Patent are hereby corrected as shown below:

Title page, Figure, should appear as follows:

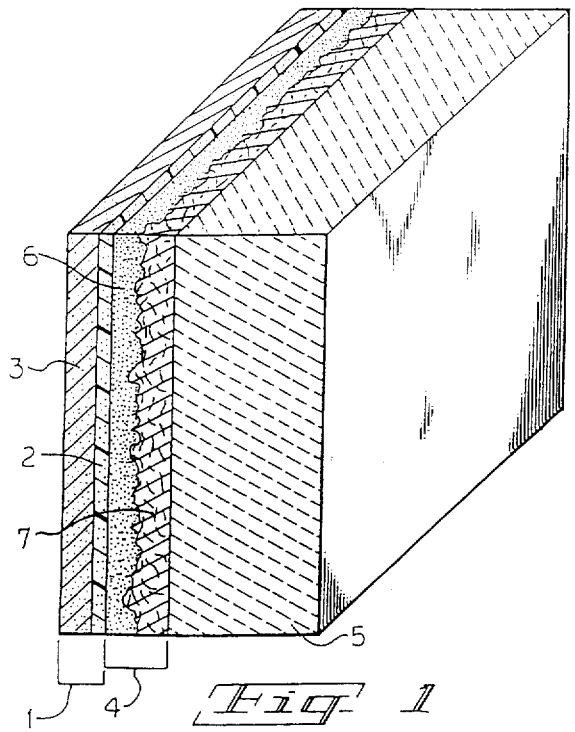

Signed and Sealed this

Twenty-second Day of May, 2001

Attest:

NICHOLAS P. GODICI

Attesting Officer     Acting Director of the United States Patent and Trademark Office